United States Patent [19]

Mark et al.

[11] 4,247,681

[45] Jan. 27, 1981

[54] AROMATIC POLYESTERS OF 9,9-BIS-(4-HYDROXYPHENYL)-FLUORENE, PHTHALIC ACIDS AND PHOSPHORUS HALIDES

[75] Inventors: Hermann Mark, Brooklyn, N.Y.; Otto Szabolcs, Vienne, Austria

[73] Assignee: Isovolta Osterreichische Isolierstoffwerke Aktiengesellschaft, Wiener Neudorf, Austria

[21] Appl. No.: 58,272

[22] Filed: Jul. 17, 1979

[30] Foreign Application Priority Data

Jul. 17, 1978 [AT] Austria .................................. 5137/78

[51] Int. Cl.³ ............................................. C08G 63/68
[52] U.S. Cl. ..................................... 528/169; 528/190
[58] Field of Search ................................ 528/169, 190

[56] References Cited

U.S. PATENT DOCUMENTS

| | | | |
|---|---|---|---|
| 3,219,627 | 11/1965 | D'Onofrio | 528/190 |
| 3,546,165 | 12/1970 | Morgan | 528/190 |
| 4,087,408 | 5/1978 | Moedritzer | 528/169 |
| 4,123,420 | 10/1978 | Kyo et al. | 528/169 |
| 4,156,663 | 5/1979 | Okamoto et al. | 528/169 |

*Primary Examiner*—Lester L. Lee
*Attorney, Agent, or Firm*—Hammond & Littell, Weissenberger and Muserlian

[57] ABSTRACT

A process for the preparation of aromatic polyesters which are characterized particularly by high-temperature stability and difficult inflammability and which show, in addition, a low development of heat and a high char yield in combustion.

8 Claims, No Drawings

AROMATIC POLYESTERS OF 9,9-BIS-(4-HYDROXYPHENYL)-FLUORENE, PHTHALIC ACIDS AND PHOSPHORUS HALIDES

BACKGROUND OF THE INVENTION

Processes for the preparation of polyesters by polycondensation of bivalent phenols with chlorides of aromatic dicarboxylic acids, like phthalac acid, isophthalic acid and terephthalic acid, have been known for a long time. Various bivalent phenols, such as hydroquinone, resorcinol, dioxydiphenyl-methane, 2,2-bis-(4-hydroxyphenyl)-propane, phenolphthalein, and others can be used. All these polyesters have a rather low temperature stability, so that they can not be used at temperatures of for example, 300° C. and above.

A similar process for the preparation of polyesters which can withstand temperatures of 300° C. is also known. According to this process, 9,9-bis-(4-hydroxyphenyl)-fluorene is used as a bivalent phenol, either alone or in admixture with other bivalent phenols. These polyesters can be prepared both by two-phase-boundary surface-condensation and by polycondensation in high boiling solvents, as well as by low temperature polycondensation in chlorinated hydrocarbons by using a suitable HCl-acceptor. If 9,9-bis-(4-hydroxyphenyl)-fluorene is used primarily in these syntheses, polyesters are obtained whose softening temperature is, any case, above 300° C. and with regard to which a true softening temperature below the decomposition temperature no longer takes place. This is particularly the case when 9,9-bis-4-(hydroxyphenyl)-fluorene is used exclusively as a phenol component.

By partial substitution of 9,9-bis-(4-hydroxyphenyl)-fluorene by other bivalent phenols, such as 2,2-bis-(4-hydroxyphenyl)-propane, the processing possibilities can generally be extended. For example, with a 50% use of 2,2-bis-(hydroxyphenyl)-propane in the phenol component, polyesters are obtained from which homogeneous molded articles can already be obtained at substantially lower temperatures than is the case with polyesters produced by the sole use of 9,9-bis-(4-hydroxyphenyl)-fluorene.

In judging the degree of flammability of plastics, it is customary to measure the so-called "limiting oxygen index" (LOI) according to U.S. specification ASTM D 2863, where the minimum concentration of oxygen in a streaming oxygen-nitrogen mixture is determined at which a combustion with the formation of flames can just be maintained in a standardized measuring arrangement. It has been found that the highest LOI value is obtained in the above-mentioned polyesters produced with 9,9-bis-(4-hydroxyphenyl)-fluorene, when the polyesters are produced almost exclusively with the use of this phenol. Depending on the chemical composition, type and shape of the test piece, LOI values of from 35 to 38% can be obtained. A small portion of 10 mol% 2,2-bis-(4-hydroxyphenyl)-propane in the phenol component results in a reduction of the LOI values to from 31 to 34% in the polyesters produced.

But even LOI values of 35-38% are at the lower limit of the admissible values for particularly critical application where a particularly low flammability is required, such as in airplanes. Other high-temperature resistant plastics, such as bis-maleimides or polyimides frequently have substantially higher LOI values, namely up to about 48%. However, during thermal decomposition of these plastics, toxic nitrogen compounds are formed, which sets certain limits to their use in the interior decoration of airplanes and other vehicles used for human transportation.

OBJECTS OF THE INVENTION

It is an object of the invention to provide a process for the preparation of aromatic polyesters.

It is also an object of the invention to provide aromatic polyesters characterized by high temperature stability and resistance to flammability.

It is further an object of the invention to provide aromatic polyesters which show a low development of heat and a high char yield in combustion.

These and other objects of the invention will become more apparent from the description below.

DESCRIPTION OF THE INVENTION

This invention is a response to the problem of providing a process for the production of suitable aromatic polyesters by polycondensation of bivalent phenols with chlorides of aromatic dicarboxylic acids, such as isophthalic acid and/or terephthalic acid, where the phenol component consists at least primarily of 9,9-bis-(4-hydroxyphenyl)-fluorene, where the polyesters produced have higher LOI values than the known polyesters of this type, and where higher values of the inherent viscosity can be achieved under similar process conditions.

According to the invention, the problem is solved by using for the polycondensation (a) a phenol component comprised primarily of 9,9-bis-(4-hydroxyphenyl)-fluorene;

(b) from about 50 to 92 mol percent, based on the number of moles of component (a), of acid chlorides of isophthalic and/or terephthalic acid; and (c) from about 8 to 50 mol percent, based on the number of moles of component (a), of one or more compounds containing phosphorous in the tri- and/or pentavalent state, said compounds having the formula

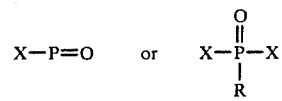

wherein X represents a halogen atom, preferably a chlorine atom, and R represents a halogen atom, preferably a chlorine atom, or an alkyl or alkoxy radical having from 1 to 6 carbon atoms or an aryl or phenoxy radical having from 6 to 10 carbon atoms.

The phenol component (a) will comprise primarily, i.e., from about 50 to 100 mol percent of 9,9-bis-(4-hydroxyphenyl)-fluorene. Other suitable bisphenols useful in component (a) include 2,2-bis-(4-hydroxyphenyl)-propane, as well as other bisphenols known to those skilled in the art.

Component (b) can be in the form of acid halides of isophthalic acid and/or terephthalic acid such as the chlorides. Advantageously, the mixture for the polycondensation comprises from 75 to 90 mol percent of component (b) and from 10 to 25 mol percent of component (c).

Preferably, component (c) comprises a mixture of phosphorous containing compounds. It is especially advantageous to employ a mixture of a compound having three halogen, preferably chlorine, atoms and one or more other compounds having two halogen, preferably chlorine, atoms. Suitable phosphorous containing compounds include phosphorous oxychloride and phenylphosphine oxide dichloride.

EXAMPLES

To further illustrate the invention, two synthesis examples representative of the state of the art and two examples according to the invention are presented below. In these examples, the synthesis were carried out by low-temperature polycondensation of the monomers dissolved in 1,2-dichloroethane in the presence of triethylamine as an HCl acceptor. A three-necked flask of ten liter capacity equipped with a stirrer, dropping funnel, and thermometer was used as a reaction vessel.

Characteristic properties of the polyesters produced in each synthesis were then measured and the results are set-forth in tabulated form below to illustrate the progress achieved with the process according to the invention. These properties are, respectively, the LOI values, determined according to the above-mentioned ASTM D 2863, as measured on a film of 0.125 mm thickness; the char yield in a nitrogen atmosphere at 800° C.; the "inherent viscosity"; and the softening and decomposition temperatures. The inherent viscosity ($\eta$ inh) is defined by the relation $$\eta\ inh = \frac{\ln \eta\ rel}{C}$$

where $\eta$ rel represents the relative viscosity and C represents the polymer concentration in the solvent during the viscosity measurement. A value of C=0.5% was maintained in the measurements.

EXAMPLE 1

The reaction vessel was charged with a Reaction Mixture A consisting of
- 315 g (0.9 mole) of 9,9-bis-(4-hydroxyphenyl)-fluorine
- 22.8 g (0.1 mole) of 2,2-bis-(4-hydroxyphenyl)-propane
- 280 ml (2 moles) of triethylamine
- 4000 ml of 1,2-dichloroethane Reaction Mixture A was dissolved and then tempered to about 30° C.

To carry out the synthesis, a solution of Reaction Mixture B, consisting of
- 101.5 (0.5 mole) of isophthaloyl chloride
- 101.5 (0.5 mole) of terephthaloyl chloride
- 1000 ml of 1,2-dichloroethane was added slowly dropwise for one hour to Reaction Mixture A in the reaction vessel, and the combined reaction mixture was allowed to react for another hour. The combined reaction mixture, which then contained the polymer in a dissolved state, was then added to a precipitating vessel under intensive stirring to 10 ml methanol, with the polymer precipitated in easily filtrable form. The precipitate was recovered, washed chloride-free first with methanol and then with water, and fially dried at 130° C. in the drying cabinet.

The yield of the aromatic polyester formed was 447 g (98% of theory). Very good films of this polyesters were obtained from a solution in dichloroethane.

Other important properties are shown below in Table I.

EXAMPLE 2

In accordance with the procedure set forth in Example 1, an aromatic polyester was formed. Reaction Mixture A consisted of:
- 350 g (1 mole) of 9,9-bis-(4-hydroxyphenyl)-fluorene
- 280 ml (2 moles) of triethylamine
- 4000 ml of 1,2-dichloroethane and Reaction Mixture B consisted of:
- 101.5 (0.5 mole) of isophthaloyl chloride
- 101.5 (0.5 mole) of terephthaloyl chloride
- 1000 ml of 1,2-dichloroethane.

The yield of the aromatic polyester formed was 475 g (99% of theory). Film formation from a solution in dichloroethane was very good. Other properties are shown below in Table I.

EXAMPLE 3

A phosphorus aromatic polyester was produced according to the process of the invention according to the process and reaction conditions of Example 1. Reaction Mixture A consisted of:
- 350 g (1 mole) of 9,9-bis-(4-hydroxhphenyl)-fluorene
- 280 ml (2 moles) of triethylamine
- 4000 ml of 1,2,-dichloroethane and Reaction Mixture b consisted of:
- 91.5 g (0.45 mole) of isophthaloyl chloride
- 91.5 g (0.45 mole) of terephthaloyl chloride
- 15.5 g (0.1 mole) of phosphorus oxychloride
- 1000 ml of 1,2-dichloroethane The yield was 458 g (97% of theory). Film formation from a solution in dichloroethane was very good. Other properties are set forth in Table I below.

EXAMPLE 4

For the production of another phosphorous aromatic polyester according to the process of the invention, the same process and reaction conditions as in Example 1 were used. Reaction Mixture A consisted of:
- 350 g (1 mole) of 9,9-bis-(4-hydroxyphenyl)-fluorene
- 280 ml (2 moles) of triethylamine
- 4000 ml of 1,2-dichloroethane and an Reaction Mixture B consisted of:
- 81.2 g (0.4 mole) of isophthaloyl chloride
- 81.2 g (0.4 mole) of terephthaloyl chloride
- 39 g (0.2 mole) of phenylphosphine oxide dichloride
- 1000 ml of 1,2-dichloroethane.

The yield was 458 g (98% of theory). Film formation from a solution in dichloroethane was very good. Other properties are set forth in Table 1 below.

The properties of the aromatic polyesters prepared in Examples 1 to 4 were evaluated according to procedures described above, and the results are set forth in the following table:

TABLE I

| Example: | 1 | 2 | 3 | 4 |
|---|---|---|---|---|
| Phosphorus content (12% by weight) | — | — | 0.58 | 1.23 |
| Inherent viscosity ($\eta$inh) | 0.60 | 0.52 | 0.68 | 0.50 |
| LOI (%) | 31 | 35 | 38 | 40 |
| Char-yield (%) | 52 | 57 | 60 | 60 |
| Softening temperature (°C.) | 330 | 350 | >350 | >350 |
| Decomposition temperature (°C.) | 480 | 490 | 500 | 500 |

With regard to Examples 1 and 2, which represent the state of the art, it should be pointed out that the 0.1 mole of 2,2-bis-(4-hydroxyphenyl)-propane used in Example 1 in addition to the 0.9 mole of 9,9-bis-(4-hydroxyphenyl)-fluorene, brought no noticeable improvement or extension of the processing possibilities in the resulting polymers. Furthermore, as can be seen from Table I, despite the higher inherent viscosity of 0.6 achieved in the above-described synthesis charge in Example 1, as compared to 0.5 in Example 2, there is clear drop of the LOI values, namely, from 35 to 31%, and of the char yield, from 57 to 52%.

The process according to the invention, represented by Examples 3 and 4, brings advantages which manifest themselves in the improved properties of the polyesters formed. First, an increase in the char yield was achieved in the polyesters with the use of phosphorous compounds according to the invention. As it can be seen further from the table, and as it was verified by additional tests, the LOI values increase with rising phosphorous content. Other properties of the polyesters obtained depend, however, greatly on the type and form of the incorporation of the phosphorus in the polymers. Thus, with the use of phosphorus oxychloride (see Example 3), the inherent viscosity ($\eta$ inh) of the polyester increased greatly with its rising mol % portion in Reaction Mixture B, particularly with a portion of more than 10 mol %. While 10 mol % phosphorus oxychloride brings only an increase to $\eta$ inh to 68, the use of 15 mol % resulted in $\eta$ inh of about 2. With this mixture, however, the solubility of the polyester produced is too low already to be able to cast usable films from the solution.

This behavior was probably due to the fact that the use of phosphorus oxychloride, which contains three reactive chlorine atoms, results in branchings and partial cross-linkages, particularly with higher percentages in the polymer chain, which manifests itself in a higher viscosity. In practice, this would have the advantage that an optimum viscosity could be obtained with the use of an adequate amount of phosphorus oxychloride but the disadvantage that the incorporation of a higher phosphorus content in the polyesters is not possible with phosphorus oxychloride alone.

This viscosity increase did not appear in Example 4 with the incorporation of phenylphosphine-oxide dichloride, a phosphorous compound with two reactive chlorine atoms, as will be readily understood. Here, a certain molar percentage of phthaloyl chloride was substituted during the polycondensation by phenylphosphine-oxide dichloride. The chain structure of the polyester produced was preserved, and a relatively high portion of phosphorus in the synthesis described in Example 4, it was 1.23% by weight, can be incorporated in the polyester.

To combine the advantages of the batch in Example 3, namely, the possibility of adjusting an optimum viscosity, and those of the batch in Example 4, it is furthermore possible within the framework of the invention to use as phosphorus compounds in Reaction Mixture B a mixture of phosphorus oxychloride and a compound or compounds which have each only two reactive chlorine atoms, such as phenylphosphine oxide dichloride.

The preceding specific embodiments are illustrative of the practice of the invention. It is to be understood, however, that other expediates known to those skilled in the art, or disclosed herein may be employed without departing from the spirit of the invention or the scope of the appended claims.

We claim:

1. An aromatic polyester composition prepared by the polycondensation of a mixture comprised of
   (a) a phenol component comprised of 50 to 100% of 9,9-bis-(4-hydroxyphenyl)-fluorene,
   (b) from about 50 to 92 mol percent, based on the number of moles of component (a), of an acid halide of isophthalic acid and/or terephthalic acid; and
   (c) from about 8 to 50 mol percent, based on the number of moles of component (a), of one or more compounds of the formula

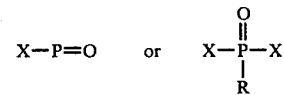

wherein X is a halogen atom and R is a halogen atom or an alkyl or alkoxy radical having from 1 to 6 carbon atoms or an aryl or phenoxy group having from 6 to 8 carbon atoms.

2. The polyester composition of claim 1 wherein the phenol component is comprised of up to 25% of 2,2-bis-(4-hydroxyphenyl)-propane.

3. The polyester composition of claim 1 wherein component (b) is comprised of isophthalic chloride and/or terephthalic chloride.

4. The polyester composition of claim 1 wherein component (c) is comprised of phosphorous oxychloride or phenylphosphine oxide dichloride, or a mixture thereof.

5. The polyester composition of claim 1 wherein the mixture comprised from about 75 to 90 mol percent of component (b) and from about 10 to 25 mol percent of component (c).

6. The polyester composition of claim 1 wherein the phosphorous compounds of component (c) are a mixture of such a phosphorous compound with three halogen atoms, and of one or more such phosphorous compounds which contain each two halogen atoms.

7. The polyester composition of claim 1 wherein each halogen atom is a chlorine atom.

8. The polyester composition of claim 1 wherein each X is a chlorine atom.

* * * * *